United States Patent

Jacobson

[11] Patent Number: 5,833,102
[45] Date of Patent: Nov. 10, 1998

[54] PORTABLE VEHICLE-MOUNTED SUPPORT

[76] Inventor: Jeffery Thomas Jacobson, R.R. 1 Box 32, Highwood, Mont. 59450

[21] Appl. No.: 748,385

[22] Filed: Nov. 13, 1996

[51] Int. Cl.$^6$ ....................................................... B60R 7/14
[52] U.S. Cl. ........................... 224/275; 224/913; 224/539; 211/64
[58] Field of Search ..................................... 224/913, 275, 224/539, 545, 567, 568, 570, 571; 211/64; 220/23.2, 23.4

[56] References Cited

U.S. PATENT DOCUMENTS

| | | | |
|---|---|---|---|
| 2,692,069 | 10/1954 | Winters et al. | 224/913 |
| 3,477,586 | 11/1969 | Haluska | 224/275 |
| 3,497,077 | 2/1970 | Sjostrand | 211/64 |
| 3,767,094 | 10/1973 | Sikes | 224/913 |
| 4,131,202 | 12/1978 | Hansen | 211/64 |
| 4,170,082 | 10/1979 | Freedman | 220/23.4 |
| 4,287,997 | 9/1981 | Rolfe et al. | 220/23.4 |
| 4,807,381 | 2/1989 | Southard | 211/64 |
| 4,852,780 | 8/1989 | Woodbury | 224/913 |
| 4,946,120 | 8/1990 | Hatcher | 224/275 |
| 4,949,890 | 8/1990 | Schultz | 224/275 |
| 5,443,191 | 8/1995 | Jorgenson | 224/913 |
| 5,495,969 | 3/1996 | Cardenas | 224/913 |

Primary Examiner—Henry J. Recla
Assistant Examiner—Gregory M. Vidovich

[57] ABSTRACT

A portable vehicle-mounted support comprising a one-piece spring action bracket capable of being mounted to the seat of a vehicle by a quick release buckle strap or belt or other appropriate securing means. The spring action bracket comprises a rigid, curved base, a U-shaped bracket rigidly supported on said curved base in a position perpendicular to said curved base, a pair of holes through the curved base, a pair of posts mounted on said curved base, a means of securing a quick release buckle strap or belt or other appropriate securing device, and a Velcro, or other quick release device, for further securing of a firearm in the U-shaped bracket of the spring action bracket. The spring action bracket of the present invention can be made of plastic or other resiliently flexible material.

4 Claims, 1 Drawing Sheet

PORTABLE VEHICLE-MOUNTED SUPPORT

BACKGROUND OF THE INVENTION

1. Field of the Invention

The present invention relates to portable vehicle-mounted supports and more particularly pertains to a portable vehicle-mounted support which may be adapted for supporting a single or a plurality of long-barreled firearms for safe vehicular transport whereby the firearms are readily accessible and no modification is required to the vehicle.

2. Description of the Prior Art

Portable vehicle-mounted supports, and particluarly portable vehicle-mounted firearm supports, are known in the art. More specifically, firearm supports heretofore devised and utilized for the purpose of supporting firearms safely and conveniently are known to consist basically of familiar, expected and obvious structural configurations, notwithstanding the myriad of designs encompassed by the prior art which have been developed for the fulfillment of countless objectives and requirements.

The present invention is directed to an improved device for supporting firearms safely and conveniently in a vehicle in a manner which is secure, economical and aesthetically pleasing.

U.S. Pat. No. 3,477,586 to Haluska describes a portable firearm rack for holding a plurality of firearms for safe transport, particularly when carried in an automobile or other vehicle. The portable firearm rack is adjustable in width and length to adapt it to a wide variety of conditions and firearm sizes. The portable firearm rack may also be carried manually or used as a storage rack. The portable firearm rack described accomplishes its objectives with a complex assemblage of numerous interconnected parts which may lead to a high cost to manufacture and to market.

The prior art also discloses a front floor mounted and seat attached vehicle firearm rack as shown in U.S. Pat. No. 3,635,381 to Hensley and a firearm rack for a vehicle of U.S. Pat. No. 4,120,436 to Burch. Both of these inventions describe a firearm rack for a single firearm only. Neither disclosure shows a way to support a plurality of firearms.

Two other pertinent patents are U.S. Pat. No. 3,857,491 to Townsend et al. which shows a vehicle mounted firearm rack and U.S. Pat. No. 4,450,989 to Bogar, Jr., which shows a firearm rack for motor vehicles. Neither of the devices disclosed is suitable for use in automobiles or in trucks with sliding rear windows.

In this respect, the portable vehicle-mounted firearm support according to the present invention substantially departs from the conventional concepts and designs of the prior art. In doing so, the portable vehicle-mounted firearm support of the present invention provides a device primarily developed for the purpose of supporting a single firearm, but may support a plurality of firearms for safe vehicular transport whereby the firearms are readily accessible and no modification is required to the vehicle.

Therefore, it can be appreciated that there exists a need for a portable vehicle-mounted firearm support which can be used for supporting a single firearm or a plurality of firearms for safe vehicular transport whereby the firearms are readily accessible and no modification is required to the vehicle. In this regard, the present invention substantially fulfills this need.

As established by the background art, efforts are continuously being made in an attempt to develop devices for supporting firearms safely and conveniently in vehicles. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of component elements, with the use of a minimum number of functioning parts, at a reasonable cost to manufacture, and by employing only readily available materials.

SUMMARY OF THE INVENTION

In view of the foregoing known types of firearm supports in the prior art, the present invention provides a new portable vehicle-mounted support which can be utilized for supporting a single firearm or a plurality of firearms for safe vehicular transport whereby the firearms are readily accessible and no modification is required to the vehicle. As such, the general purpose of the present invention, which will be described subsequently in greater detail, is to provide a new portable vehicle-mounted firearm support apparatus which has all of the advantages of the prior art firearm supports and none of the disadvantages.

The invention is defined by the appended claims with the specific embodiment shown in the attached drawings. For the purpose of summarizing the invention, the new portable vehicle-mounted support comprises a one-piece spring action bracket capable of being mounted to the seat of a vehicle by a quick release buckle strap or belt or other appropriate securing means. The spring action bracket further comprises a rigid, curved base. The spring action bracket further comprises a U-shaped bracket rigidly supported on said curved base in a position perpendicular to said curved base. The spring action bracket further comprises a pair of holes through the curved base, said pair of holes being located on said curved base on the left-hand side of said curved base as said curved base would be in mounted and secured position on the seat of the vehicle. The spring action bracket further comprises a pair of posts mounted on said curved base, said pair of posts being located on said curved base on the right-hand side of said curved base as said curved base would be in mounted and secured position on the seat of the vehicle. Said pair of posts on said bracket are adapted to respectively receive a pair of holes on another bracket substantially identical to said bracket and said pair of holes on said bracket are adapted to respectively receive a pair of posts on another bracket substantially identical to said bracket, thus providing for the securing of a plurality of firearms. The spring action bracket further comprises a means of securing a quick release buckle strap or belt or other appropriate securing means. The spring action bracket further has a Velcro (hook and loop fastener), or other quick release device, for further securing of the firearm in the U-shaped bracket of the spring action bracket. The spring action bracket of the present invention can be made of plastic or other resiliently flexible material.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific structures may be readily utilized as a basis for modifying or designing other structures for carrying out the same purposes of the present invention. It should be realized by those skilled in the art that such equivalent structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a portable vehicle-mounted support for safely transporting a single firearm or a plurality of firearms.

It is another object of the present invention to provide a new portable vehicle-mounted support which may be easily and efficiently manufactured and marketed.

It is a further object of the present invention to provide a new portable vehicle-mounted support which is of a durable and reliable construction.

An even further object of the present invention is to provide a new portable vehicle-mounted support which is susceptible of a low cost of manufacture with regard to both materials and labor, and which accordingly is then susceptible of low prices of sale to the consuming public, thereby making such portable vehicle-mounted supports economically available to the buying public.

Still yet another object of the present invention is to provide a new portable vehicle-mounted support which provides in the apparatus and methods of the prior art some of the advantages thereof, while simultaneously overcoming some of the disadvantages normally associated therewith.

Still yet another object of the present invention is to provide a new portable vehicle-mounted support for supporting a single firearm or a plurality of firearms whereby the firearms are readily accessible.

Yet another object of the present invention is to provide a new portable vehicle-mounted support that does not attach directly to the vehicle thereby providing an apparatus easily moved from vehicle to vehicle and which requires no modification to the vehicle.

Even still another object of the present invention is to provide a new portable vehicle-mounted support that can be used in cars, trucks, and trucks with sliding rear windows.

Yet still another object of the present invention is to provide a new portable vehicle-mounted support that will protect the firearms from scratching and marring.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive means in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

IN THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
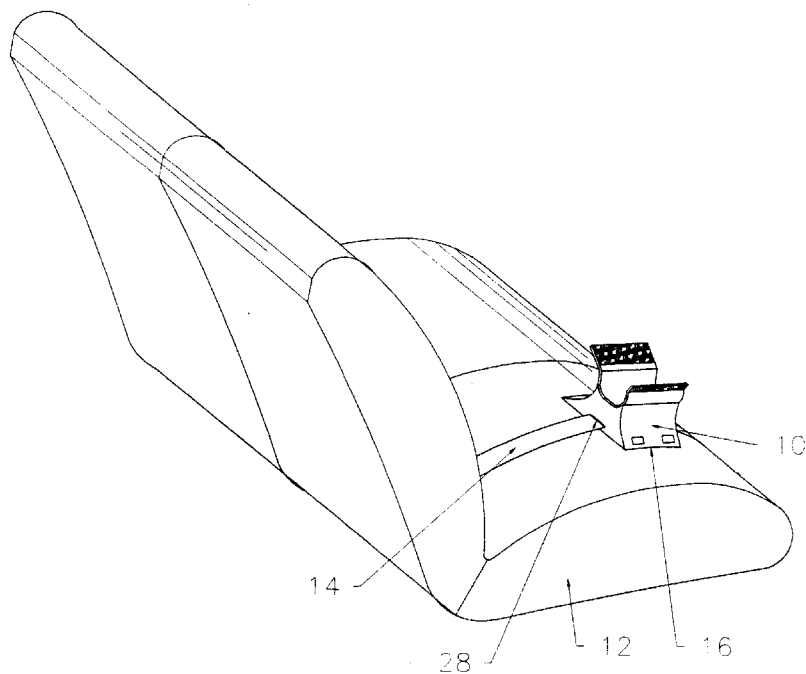
FIG. 1 is a side view of the new portable vehicle-mounted support secured to the seat of a vehicle.
Figure 2:
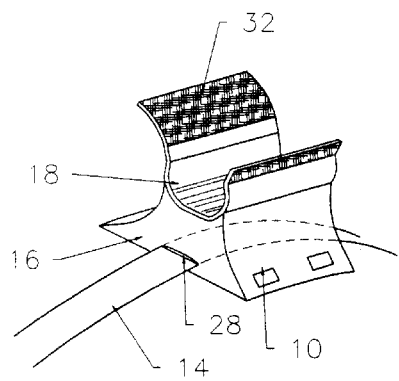
FIG. 2 is a side view of the new portable vehicle-mounted support with the quick release device in open position.
Figure 3:
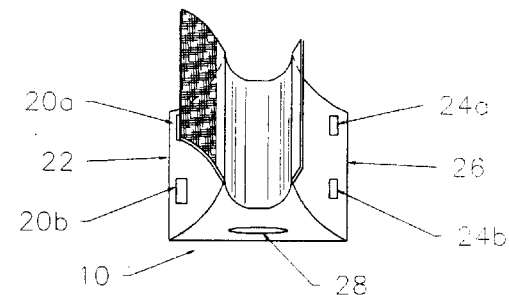
FIG. 3 is a top view of the new portable vehicle-mounted support with the quick release device in open position.
Figure 4:
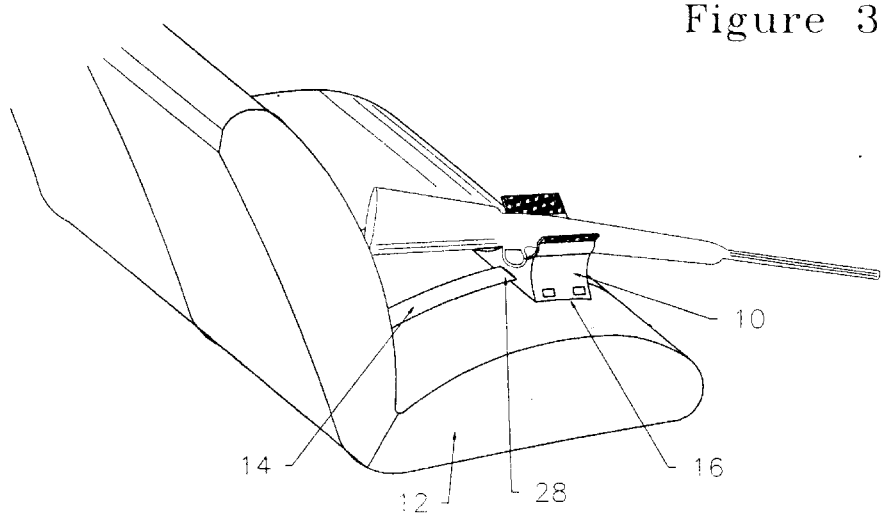
FIG. 4 is a side view of the new portable vehicle-mounted support secured to the seat of a vehicle with a firearm secured therein.

With reference now to the drawings, and in particular to FIGS. 1–4 thereof, a new portable vehicle-mounted support embodying the principles and concepts of the present invention will be described.

From an overview standpoint, the portable vehicle-mounted support is adapted for use for supporting a single firearm or a plurality of firearms for safe vehicular transport whereby the firearms are readily accessible and no modification is required to the vehicle.

The new portable vehicle-mounted support comprises a one-piece spring action bracket 10 capable of being mounted to the seat 12 of a vehicle by a quick release buckle strap or belt or other appropriate securing means 14. The spring action bracket 10 further comprises a rigid, curved base 16. The spring action bracket 10 further comprises a U-shaped bracket 18 rigidly supported on said curved base 16 in a position perpendicular to said curved base 16. The spring action bracket 10 further comprises a pair of holes 20a, 20b through the curved base 16, said pair of holes 20a, 20b being located on said curved base 16 on the left-hand side 22 of said curved base 16 as said curved base 16 would be in mounted and secured position on the seat 12 of the vehicle. The spring action bracket 10 further comprises a pair of posts 24a, 24b mounted on said curved base 16, said pair of posts 24a, 24b being located on said curved base 16 on the right-hand side 26 of said curved base 16 as said curved base 16 would be in mounted and secured position on the seat 12 of the vehicle. Said pair of posts 24a, 24b being compatible with and securing to said pair of holes 20a, 20b such that said pair of posts 24a, 24b of one curved base 16 secures to said pair of holes 20a, 20b on another curved base 16, thus providing for the securing of a plurality of firearms. The spring action bracket 10 further comprises a means 28 of securing a quick release buckle strap or belt or other appropriate securing means 14. The spring action bracket 10 further has a Velcro 32, or other quick release device, for further securing of the firearm in the U-shaped bracket 18 of the spring action bracket 10. The spring action bracket 10 of the present invention can be made of plastic or other resiliently flexible material.

In operation, the spring action bracket 10 of the present invention is placed on the seat 12 of the vehicle with the curved base 16 contouring and configuring with the curve of the front of the seat 12. A quick release buckle strap or belt or other appropriate securing means 14 is secured to the curved base 16, wrapped around the seat 12 of the vehicle and secured to securely position the spring action bracket 10 of the present invention to the seat 12 of the vehicle. A firearm is then positioned in the U-shaped bracket 18 by placing and forcing the stock or other portion of the firearm into the U-shaped bracket 18, said U-shaped bracket 18 being resiliently flexible to accommodate and secure the firearm in spring-like manner. The Velcro 32, or other quick release device, on the spring action bracket 10 is then fastened, further securing the firearm in the U-shaped bracket 18 of the spring action bracket 10.

When a plurality of firearms are to be transported, a plurality of spring action brackets 10 are aligned side-by-side on the seat 12 of the vehicle and a first spring action bracket 10 is secured to the seat 12 of the vehicle as described hereinabove. A pair of posts 24a, 24b of one curved base 16 secures to a pair of holes 20a, 20b on another curved base 16 of the plurality of spring action brackets 10, thus providing for side-by-side positioning and securing of the plurality of spring action brackets 10 and the securing of a plurality of firearms.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

While particular embodiments of the invention have been shown and described, it will be understood that the invention is not limited thereto, since modifications may be made that will become apparent to those skilled in the art.

What is claimed is:

1. A portable vehicle-mounted support, for use in vehicles having a seat, for supporting a long-barreled firearm for safe transport whereby the firearm is readily accessible and no modification is required to the vehicle, the portable vehicle-mounted support comprising:

a first one-piece spring action bracket;

said spring action bracket having a rigid, curved base;

said spring action bracket further having a U-shaped bracket, said U-shaped bracket being rigidly supported on said curved base in a position perpendicular to said curved base;

said spring action bracket having a pair of holes through said curved base, said pair of holes being located on said curved base on a left-hand side of said curved base as said curved base would be in a mounted and secured position on the seat of the vehicle;

said spring action bracket having a pair of posts mounted on said curved base, said pair of posts being located on said curved base on a right-hand side of said curved base as said curved base would be in a mounted and secured position on the seat of the vehicle, said spring action bracket further having a means of securing a quick release securing means thereto for securing said spring action bracket on the seat of the vehicle; and, said spring action bracket further having a quick release device, for securing the long-barreled firearm in the U-shaped bracket of the spring action bracket wherein said pair of posts on said first bracket are selectively adapted to respectively receive a pair of holes on a second bracket substantially identical to said first bracket and said pair of holes on said first bracket are selectively adapted to respectively receive a pair of posts on a third bracket substantially identical to said first bracket, thus providing for the securing of a plurality of firearms on the seat of the vehicle.

2. The portable vehicle-mounted support of claim 1 wherein said first bracket is formed of plastic or other resiliently flexible material.

3. The portable vehicle-mounted support of claim 1 wherein said quick release device comprising a hook and loop fastener.

4. The portable vehicle-mounted support of claim 1 wherein said securing means comprises a buckle or strap.

* * * * *